Figure 1:
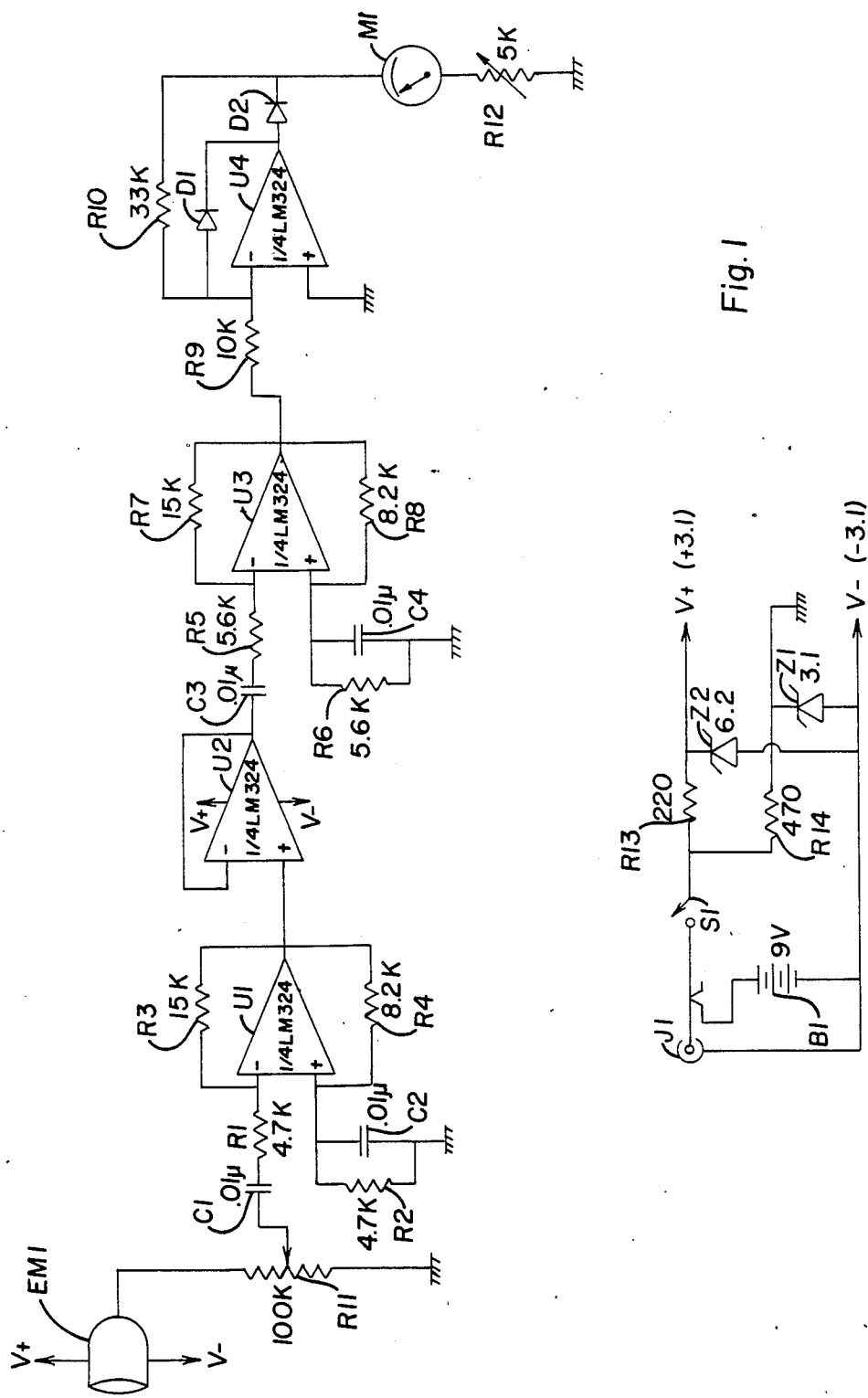

United States Patent [19]

Goodwin

[11] Patent Number: 4,692,117
[45] Date of Patent: Sep. 8, 1987

[54] ACOUSTIC ENERGY, REAL-TIME SPECTRUM ANALYZER

[76] Inventor: Allen W. Goodwin, 3051 Kirklevington, #102, Lexington, Ky. 40502

[21] Appl. No.: 689,718

[22] Filed: Jan. 8, 1984

Related U.S. Application Data

[63] Continuation-in-part of Ser. No. 404,708, Aug. 3, 1982, abandoned.

[51] Int. Cl.⁴ .................. G09B 15/00; G09B 19/04
[52] U.S. Cl. .......................... 434/185; 84/464 R; 84/466; 84/DIG. 9; 381/50
[58] Field of Search ............ 73/642, 659, 658; 84/DIG. 9, 10, 11, 6, 464 R, 466; 179/121 R; 324/77 B; 434/185; 381/48, 50

[56] References Cited

U.S. PATENT DOCUMENTS

| | | | |
|---|---|---|---|
| 3,688,010 | 8/1972 | Freeman | 84/DIG. 9 |
| 3,960,043 | 6/1976 | Brand | 84/DIG. 9 |
| 3,989,896 | 11/1976 | Reitboeck | 381/50 |
| 4,024,789 | 5/1977 | Humphrey et al. | 84/464 |
| 4,063,035 | 12/1977 | Appelman et al. | 381/48 |
| 4,075,423 | 2/1978 | Martin et al. | 381/50 |
| 4,211,138 | 7/1980 | Deutsch | 84/DIG. 9 |
| 4,374,482 | 2/1983 | Moore et al. | 84/DIG. 9 |
| 4,401,850 | 8/1983 | Harbeson | 381/48 |

*Primary Examiner*—Richard C. Pinkham
*Assistant Examiner*—MaryAnn Stoll Lastova

[57] ABSTRACT

Disclosed is a real-time spectrum analyzer for monitoring acoustic energy, in particular a singer's formant, comprising a microphone element for converting the energy of a singer's voice to an electrical signal, band-pass filters for filtering the signal and selectively passing a portion thereof in a dedicated frequency range of from about 2500 to about 3500 Hz corresponding to singer's formant to a display meter responsive to the portion for visually displaying the magnitude of the total energy of said portion, the band-pass filters being connected in series and tuned to different center frequencies but overlapping from about 20% to about 60% of the total pass-band.

1 Claim, 1 Drawing Figure

ACOUSTIC ENERGY, REAL-TIME SPECTRUM ANALYZER

This application is a continuation-in-part of Ser. No. 404,708 filed 8-3-82, now abandoned.

DESCRIPTION

This invention concerns an electronic biofeedback device, hereafter "analyzer," designed to aid voice students in producing the "singer's formant." This acoustic feature is a peak in the sound spectrum of tones produced by singers trained in the concert/operatic tradition. It imparts a characteristic timbre to the sound and makes it possible for a singer to be heard over an orchestra.

Utilizing electronic filter means, the analyzer separates the singer's formant from the sound as a whole and indicates its strength on a meter. As a singer changes factors such as breath pressure or articulatory positions, the effect of those changes upon the strength of the singer's formant can be seen simultaneously on the meter. The sounds of speech, the piano, and orchestral instruments show little or no response on the meter. By noting the aural, tactile, and kinesthetic sensations experienced as the meter indicates the amplitude of the singer's formant, a singer can develop vocal techniques which produce the desired characteristic. Thus the analyzer can function as a biofeedback device to control the vocal output.

Use of the analyzer tends to clarify certain directives which employ psychological imagery. For example, tones sung with a "forward placement" produce a higher meter reading than tones which are "back." Differences in the amplitude of the singer's formant with different vowels and different vocal qualities are also shown by the meter. While the response of the human perception mechanism to vocal tones varies, the response of the machine is consistent, thereby providing the singer with a steady reference point for monitoring his vocal efforts.

In the analyzer, a special electronic filter means separates the acoustical features constituting the singer's formant from the sound as a whole. The strength of this filtered component is measured by a moving coil meter, similar, for example, to the VU meter on a tape recorder. The relative amplitude of the singer's formant in a given sound is displayed by the meter as the sound is produced. Changes in the strength of the singer's formant resulting from changes in breath support, positions of the mouth, lips, and tongue, or other factors can be seen immediately on the meter. A sensitivity control permits adjusting the meter to accommodate a wide dynamic range.

Spectrum analyzers, as they are generally constructed, consist of a bank of filters, each tuned to standardized center frequencies, e.g., one-third octave apart, and encompassing a wide range of frequencies, e.g., 20-20,000 Hz. The energy present in each of these several bands or channels is displayed as a bar graph or as a line on an XY graph. Spectrum analyzers which sample the sound rapidly and constantly update the graph on a video screen or a matrix of LED's are termed "real-time" spectrum analyzers since changes in sound spectra can be observed on the displays in real time as they occur.

Spectrum analyzers like those described above are unsuited for the function of monitoring the singer's formant in a teaching/learning situation for several reasons. A principal problem with their use is that the frequency range of the singer's formant does not correspond to the standardized frequency ranges of the prior spectrum analyzers. Thus, while the energy present in the singer's formant can be monitored in a crude manner with such devices, the visual readings are not effective for monitoring the singer's formant as an independent entity since acoustic energy outside the frequency range of interest is also being displayed. Thus it is difficult with such devices for a singer to observe the effects of his efforts to strengthen the formant, e.g., by changing his breath pressure or the positions of the mouth, lips, and tongue.

The present analyzer differs from conventional spectrum analyzers in several respects as follows:

(1) It has filters which pass energy lying in the range of the singer's formant with little or no attenuation while sharply attenuating energy on all other frequencies, that is, the frequency-response curves at the ends of the pass-band window have steep slopes, while the frequency-response curve within the pass-band window is fairly flat or only slightly peaked;

(2) The frequency range of the filter system encompasses the slightly different center frequencies of the singer's formant which occur with different individual singers, male and female singers, and with different vowels;

(3) The analyzer is battery powered to maximize its flexibility of use in a variety of environments from the teaching studio to the practice room. The battery, preferably, is an ordinary nine-volt battery, desirable because of its wide availability and standard use in other electronic devices. Additionally, the present circuitry sharply reduces current drain and allows use of batteries. Moreover, the circuit design insures that the performance of the device is not significantly affected by decreases in power-supply voltage as the battery weakens over time;

(4) The input microphone has a relatively flat frequency response across the frequency range of interest. It also has a voltage output strong enough that further amplification is not required before the filter stages. Additionally, the microphone module is built into the case, as opposed to being an external device at the end of a cord, so that the device can be managed easily;

(5) The electronic design is such that individual units can be calibrated to a common standard of frequency response and sensitivity; and (6) A wide dynamic range is accomodated so that the analyzer can be used by singers capable of producing a strong singer's formant and also by beginning singers capable of producing only a weak singer's formant. This is achieved by a variable sensitivity control, available for easy adjustment on the front panel.

In the present analyzer, there are four principal circuit functions as follows:

(1) A means for converting a voice sound to a corresponding electrical voltage. This is achieved by a microphone which preferably has a flat frequency response across the frequency range of interest (2500-3500 Hz), an output sufficient that further amplification is not required prior to the signal entering the filtering stage, a sensitivity unaffected by changes in battery supply voltage, since the power supply voltage preferably is clamped to $+-3.1$ volts by zener diodes, and which is physically small and inexpensive;

(2) A means for filtering the signal output of the microphone so that only those frequency components lying in the range 2500-3500 Hz are passed and all other frequencies are strongly suppressed. Several filtering schemes are possible. The arrangement in the circuit example, however, has the following desirable features:

(a) Very steep filter skirts, thereby sharply attenuating even nearby frequencies outside the overall pass-band of interest of from about 2500 to about 3500 Hz. This is achieved by cascading two narrow band-pass filters, the first tuned to a center frequency of about 3200 Hz, the second tuned to a center frequency of about 2750 Hz. The frequency pass-bands of each filter overlap, providing the aforesaid overall pass-band having steeper skirts than would be achieved by cascading a high-pass and low-pass filter;

(b) It uses a minimum of components, i.e., three sections of a quad opamp IC, eight resistors, and four capacitors, all of which are fixed and require no adjustment; and (c) It possesses characteristics which are desirable in a filter but which are often mutually exclusive, i.e., high Q (selectivity), good stability (does not break into oscillation), and good dynamic range (works with both strong and weak signals).

(3) A means for rectifying the filtered signal so that its amplitude can be measured. Several schemes are possible, such as the use of singer diode, however, the exemplary circuit possesses a number of desirable features:

(a) It is a precision full-wave active rectifier. This allows it to rectify signals across a wide dynamic range with equal response (passive rectifiers working with diodes do not work with signals under 0.6 volts and their characteristics vary with the individual diodes being used). A full wave rectifier provides a smoother DC output voltage than does a half-wave rectifier; and (b) It uses the remaining opamp available on the quad opamp IC package used by the filter.

(4) A means for measuring the amplitude of the filtered component and displaying the amplitude in such a manner that it can be monitored in real time by a singer. Several schemes are possible, including a row of light emitting diodes (LED's) or a moving-coil meter. The example circuit uses a 200 microamp moving-coil meter because it involves fewer individual components, and requires fewer adjustments than would an LED configuration. The precision of the meter is unimportant in this application because the singer needs only to monitor the relative position of the needle as different sounds are produced. The specific values indicated by the meter, e.g., 120 microamps, has no relevance for the singer using the device as a biofeedback instrument for monitoring the singer's formant. Researchers using the device in research projects concerned with the singer's formant might use the specific values indicated on the meter face, however.

The accompanying schematic of an exemplary circuit for the present analyzer depicts the above functions and other preferred elements which enhance the overall operation and/or usefulness of the device, i.e.:

(a) A means for calibrating the device so that different individual units indicate the same meter readings with the same input signal. This is achieved in the example circuit by a variable resistor (R12) between the meter and ground. This resistor is mounted on the circuit board itself and is not accessible to the user of the device;

(b) A means for adjusting the sensitivity of the device so that it accomodates signals over a wide dynamic range, i.e., singers having very weak or strong singer's formants. This is achieved in the example circuit by a variable resistor (R11) between the microphone and the first filter stage. This resistor is mounted on the front panel, where it may be adjusted by the singer; and (c) A means for powering the device with a single nine-volt battery, thereby permitting the machine to be portable and/or hand-held, while at the same time keeping the voltage level constant even as the battery power declines. This is achieved in the example circuit by a configuration employing zener diodes across the battery output. One zener diode (Z2) clamps its output to 6.2 volts (relative to the negative pole of the battery) while the other zener diode (Z1) clamps its output to 3.1 volts (relative to the negative pole of the battery). The device itself uses the 3.1 voltage point as its ground, using the negative pole of the battery as a source of −3.1 volts and the output of the Z2 as the source of +3.1 volts. The power supply voltage to the circuit is thus +3.1 volts and −3.1 volts, remaining at those set levels until the battery weakens to below 6.2 volts.

Referring further to the schematic, the sound is received by EM1, an electrolet microphone element which converts the sound into a corresponding electrical signal. The microphone is powered by six volts. The combination of R13 and Z2 insures that the nine volts from the battery is reduced to the six volts required by the microphone. The microphone signal is passed through an adjustable voltage divider (R11), which functions as a sensitivity control. This allows the device to be adjusted to accomodate a wide dynamic range. That is, weak signals can be amplified more so that they can be shown on the meter while strong signals can be amplified less so that they do not "pin" the needle of the meter.

The signal from the voltage divider is passed through a band-pass filter (U1) which is tuned to a center frequency of about 3200 Hz. The frequency of this filter is determined by C1, C2, R2, and R3, while the circuit Q (sharpness) and amplifier gain are determined by R3 and R4. U2 is a voltage follower, which matches the low impedance output of U1 to the high impedance input of the next filter section.

The signal next passes through another band-pass filter (C3, C4, R5, R6, U3, R7, R8), which is electrically identical to the first filter except it is tuned to a center frequency of about 2750 Hz. The net effect of the two band-pass filters in series is a filtering function where signals in the range 2500-3500 Hz are passed through while signals outside that range are sharply attenuated. The active rectifier consisting of U4, R9, R10, U1, and D1, and D2 provides a DC voltage for the 200 microamp meter (MI) Which displays the amplitude of the signal lying within the pass-band of the filters. The filter also has a voltage gain of approximately 3, set by the ratio R10/R9. A variable register (R12) between the meter and ground permits the sensitivity of the device to be sealed so that different units will show the same meter reading with the same input signal.

U1, U2, U3, and U4 are all contained in a single LM324 integrated circuit package. The power is supplied by B1, a nine-volt battery. Z1 and Z2 are zener diodes which clamp the voltage at −3.1 volts and 6.2 volts with respect to the negative pole of the battery. The circuitry of the filters and active rectifier use the 3.1 voltage point as ground, the negative pole of the batery as −3.1 volts, and the output of Z2 as +3.1 volts. R13 and R14 serve as current limiting resistors. S1 is an on/off switch, and J1 is a jack which permits bypassing the battery and using an external voltage source, such as an AC adapter.

One of the most important aspects of the present invention is the use of a unidimensional, real-time display means which displays visually the magnitude of the total formant energy only within the fixed passband. The unidimensional character of the display means is very important as it allows the singer to view, for example, only one reading on a hand held meter or one light which increases in intensity as the formant energy increases, in order to make an immediate assessment of the magnitude of his formant energy. This feature obviates the need for the singer to view other and extraneous energy characteristics of his voice such as vowel identification frequencies and energy levels associated with normal speech sounds, and allows him to immediately experiment with his breath pressure, articulatory position or the like to improve his vocal energy output within the formant range.

The invention has been described in detail with particular reference to preferred embodiments thereof, but it will be understood that variations and modifications can be effected within the spirit and scope of the invention.

I claim:

1. A real-time spectrum analyzer for monitoring and visually displaying acoustic energy solely in the range of singer's formant, comprising means for converting said energy to an electrical signal, filtering means having a non-adjustable bandwidth extending from about 2500 to about 3500 Hz and a non-adjustable passband shape consisting of essentially no attenuation throughout the 2500–3500 Hz passband and attenuation at a rate of at least 18 db per octave outside the passband, said filtering means comprising two band-pass filters, one tuned to about 2750 Hz center frequency and the other to about 3,200 Hz center frequency, and unidimensional real-time display means for displaying visually the magnitude of the total amplitude of energy within the fixed said passband while not responding or adjusting to respond to energy outside said passband.

* * * * *